No. 641,164. Patented Jan. 9, 1900.
E. STODDARD & H. G. RICHARDS.
A. I. RICHARDS, Administratrix of H. G. RICHARDS, Dec'd.
ELEVATOR.
(Application filed Dec. 13, 1898.)

(No Model.) 3 Sheets—Sheet 2.

Witnesses.
L. F. Griswold
E. E. Osborne

Inventors
Edgar J. Stoddard
Anna I. Richards
By J. A. Osborne & Co
Attorneys

No. 641,164. Patented Jan. 9, 1900.
E. STODDARD & H. G. RICHARDS.
A. I. RICHARDS, Administratrix of H. G. RICHARDS, Dec'd.
ELEVATOR.
(Application filed Dec. 13, 1898.)
(No Model.) 3 Sheets—Sheet 3.
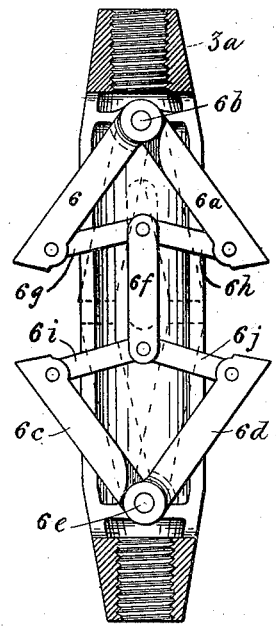
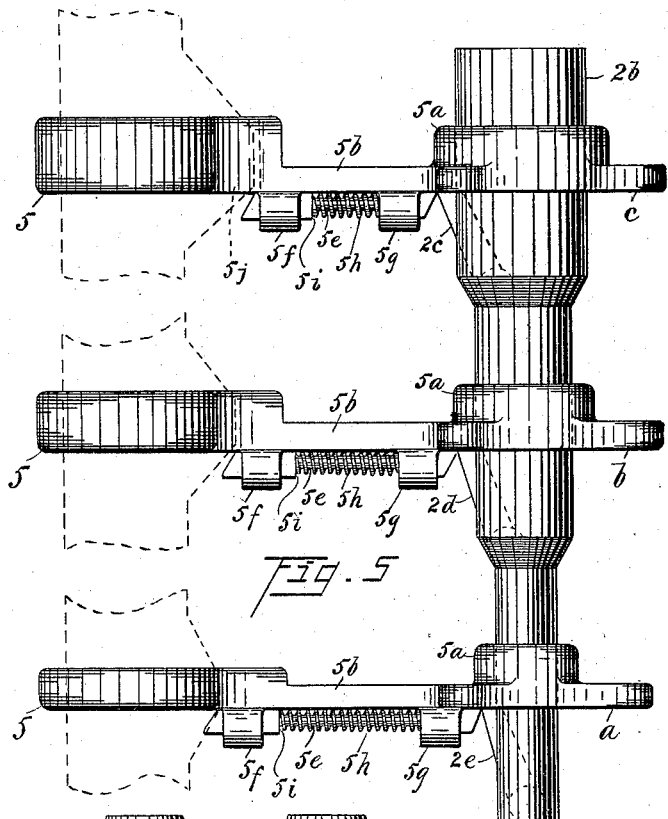
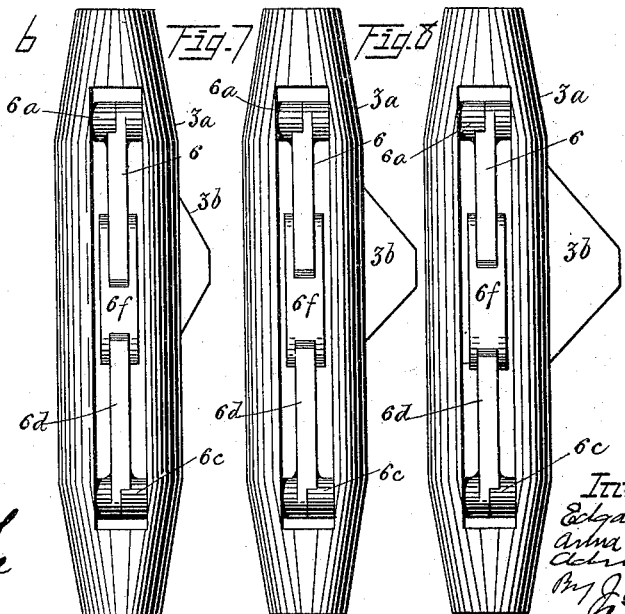

UNITED STATES PATENT OFFICE.

EDGAR STODDARD, OF CLEVELAND, OHIO, AND ANNA I. RICHARDS, OF TOLEDO, OHIO, ADMINISTRATRIX OF HARRY G. RICHARDS, DECEASED, ASSIGNORS, BY DIRECT AND MESNE ASSIGNMENTS, TO EDWARD J. THOBABEN, OF CLEVELAND, OHIO, HARRY C. RICHARDS, AND JACOB A. BLODT.

ELEVATOR.

SPECIFICATION forming part of Letters Patent No. 641,164, dated January 9, 1900.

Application filed December 13, 1898. Serial No. 699,191. (No model.)

*To all whom it may concern:*

Be it known that I, EDGAR STODDARD, a citizen of the United States, residing in Cleveland, in the county of Cuyahoga, and HARRY G. RICHARDS, deceased, late a citizen of the United States, and a resident of Toledo, in the county of Lucas, State of Ohio, have invented certain new and useful Improvements in Elevators, of which the following, with the accompanying drawings, is a full, clear, and an exact description, such as will enable those skilled in the art to which it appertains to make and use the same.

Said invention relates to an apparatus operated in connection with freight and passenger elevators for automatically opening and closing the hatchways in the shaft at the different floors in the passage of the elevator-car.

At the date of the said invention apparatuses were in use for automatically opening and closing the hatchways of elevator-shafts; but they occupy considerable space in the shaft and are not applicable to all constructions and shapes of shafts, as their operation and reliability depend upon their adjustment relative to the sides of the hatchway.

The object of this invention is to provide a reliable apparatus occupying very little space in the shaft and which will automatically open the hatchway to permit the elevator-car to pass through and leave said hatchway closed after the car shall have passed, the construction of the device being such that it is applicable to elevator-shafts of any size, shape, or construction, the different parts of the apparatus coöperating with each other irrespective of the sides of the hatchway.

Figure 1:
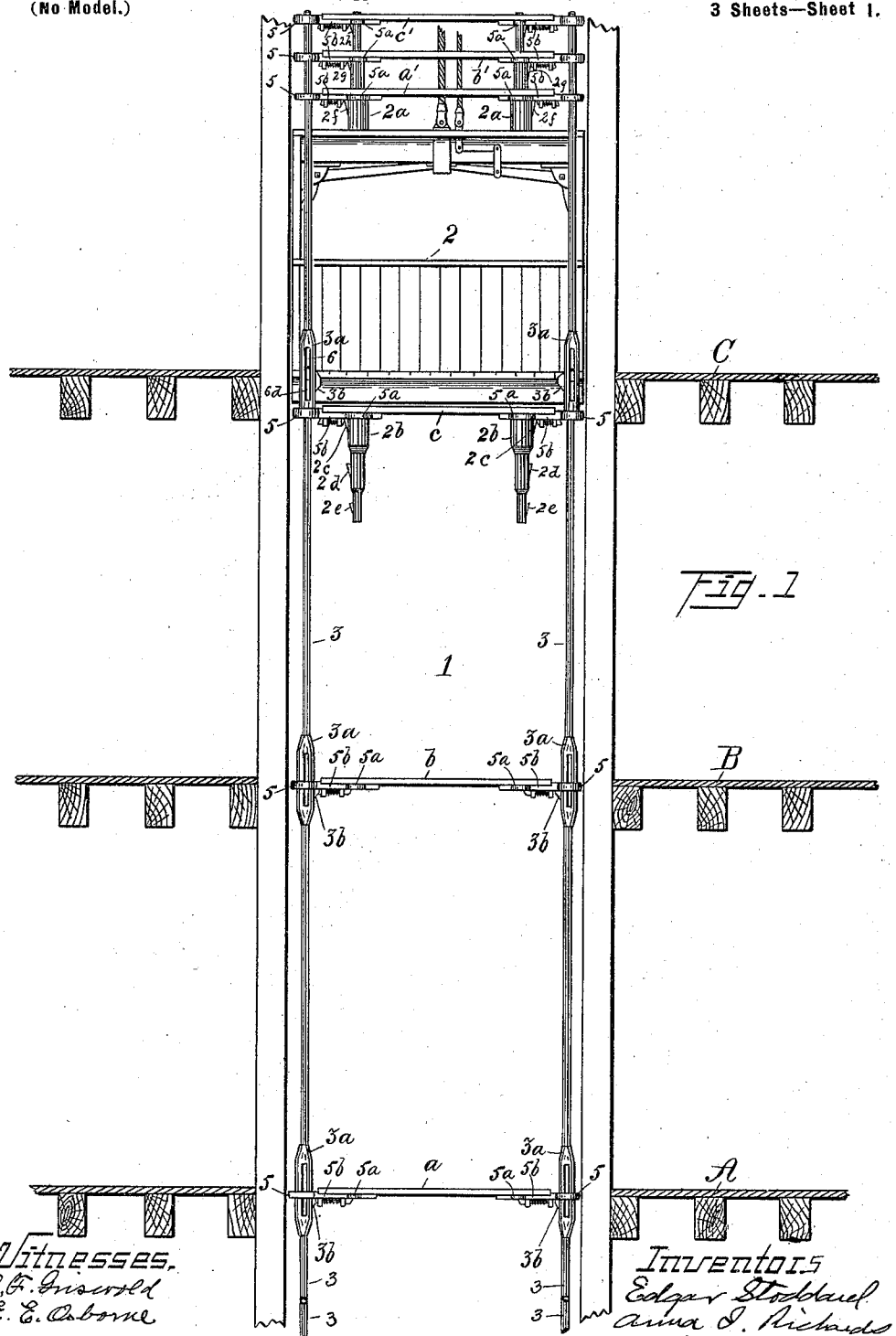
Figure 2:
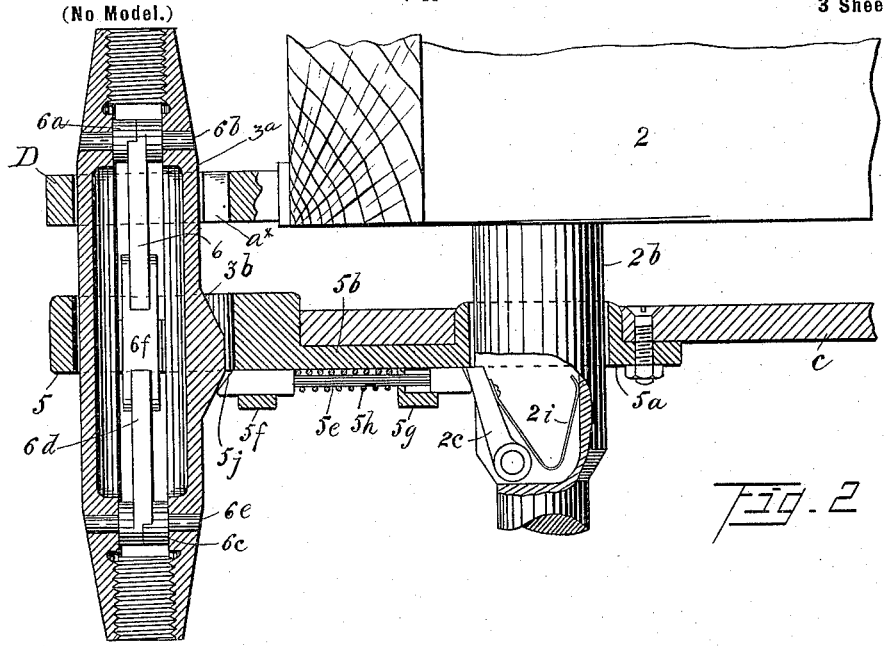
Figure 3:
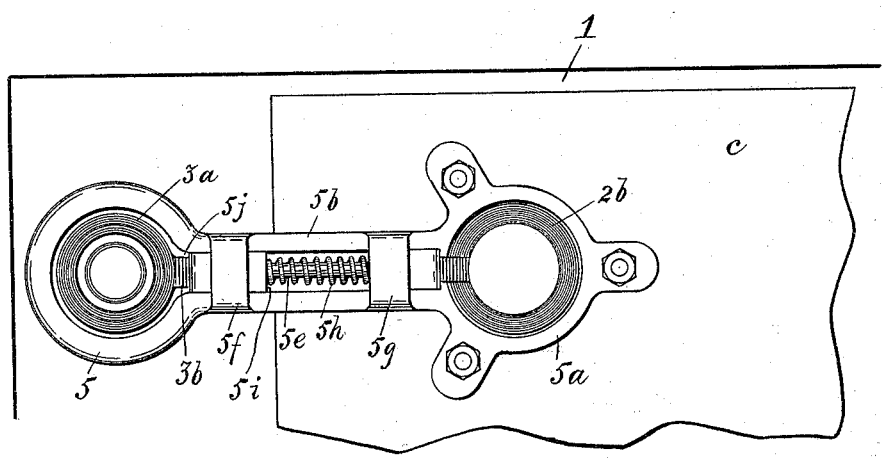

In the drawings, Figure 1 is a vertical section through an elevator-shaft through three floors of a four-story building, showing a front elevation of an elevator embodying the present invention. Fig. 2 is an enlarged horizontal vertical section through one corner of the bottom of the car and through this improved device. Fig. 3 is an inverted plan view of the device, showing its position relative to the elevator-shaft. Fig. 4 is a vertical section on the line $xx$ of Fig. 2. Fig. 5 is a front elevation of one of the posts attached to the car and on which the hatch-closers are carried. Figs. 6, 7, and 8 are front views of the rod at the different floors, and Fig. 9 is a cross-section of a modified form of a part of the device fully explained hereinafter.

Similar characters of reference designate similar parts throughout the drawings and specification.

A, B, and C are three floors of a building. 1 is the elevator-shaft, in which the elevator-car 2 is operated by any known means. Hanging freely in each of the four corners of the shaft and extending from the top to the bottom thereof are the rods 3. These rods are made fast at their upper and lower ends by any suitable means (not shown) and may be provided with turnbuckles or other device for keeping them taut. On the rods 3 at each of the floors is preferably an enlargement $3^a$. To facilitate the making of this portion of the apparatus and also to lessen its weight, sections of pipe are employed to form the rods, and the parts $3^a$ are castings into which the pipe-sections are threaded. Pivoted within the enlargements $3^a$ are toggles, the purpose, construction, and operation of which will presently be explained. Rising from the top of the elevator-car in proximity to each of its corners are posts $2^a$, and depending from the bottom of said car in proximity to each of its corners are similar posts $2^b$. These posts are stepped, as shown in the drawings, there being one less step on each post than there are floors in the building. This specification describes the application of this invention to an elevator of a four-story building. It is necessary to show but three of the floors in the drawings, for the reason that there is one less step on each of said posts and one less hatch-cover above and one less hatch-cover below the car than there are stories. The hatch-covers $a$, $b$, and $c$ and $a'$, $b'$, and $c'$ (two for each floor except one) are of light construction, but of the required strength, and are the shape and nearly the size of the hatchways. Secured to the under side of the hatch-covers $a$, $b$, and $c$ and $a'$, $b'$, and $c'$ at each of their corners are castings. These castings consist of two rings 5 and $5^a$, connected by the neck $5^b$. The posts $2^a$ and $2^b$ pass through the rings $5^a$, and the rods 3 pass freely through the rings 5. The rings 5 of all the castings are the same diameter; but the diameter of the rings $5^a$ varies in the same proportion as the diameters of the different steps of the posts $2^a$ and $2^b$ vary for the purpose hereinafter specified. Spring-pressed dogs $2^c$, $2^d$, $2^e$, $2^f$, $2^g$, and $2^h$ are pivoted in the steps of the posts $2^a$ and $2^b$, and in their normal positions their free ends are held the desired distance outside the circumference of that portion of the post in which they are pivoted by the springs $2^i$.

On the under side of the neck $5^b$ is a bolt $5^e$, which is adapted to slide in the guides $5^f$ and $5^g$. Around the bolt $5^e$ is a spiral spring $5^h$, one end of which bears against the guide $5^g$, and the other end bears against the shoulder $5^i$ on the bolt.

The toggles which are pivoted in the enlargements $3^a$ will now be described. They consist of the two levers 6 and $6^a$, pivoted on the same pivot $6^b$, and the two levers $6^c$ and $6^d$, pivoted on the pivot $6^e$. A bar $6^f$ has two links $6^g$ and $6^h$ pivoted to its upper end and two similar links $6^i$ and $6^j$ pivoted to its lower end. The outer ends of the links $6^g$ and $6^h$ and $6^i$ and $6^j$ are pivoted to the levers 6, $6^a$, $6^c$, and $6^d$, respectively. The bar $6^f$ is sufficiently heavy to drop by gravity or may be made to drop by means of suitable springs or otherwise, and thus through the medium of the pivoted links $6^g$, $6^h$, $6^i$, and $6^j$ cause the free ends of the levers 6, $6^a$, $6^c$, and $6^d$ to recede from each other or, in other words, cause the toggle to open. When the apparatus is in its normal position, the toggles are all open.

On the enlargements $3^a$ are projections $3^b$, and a slot $5^j$ is cut in the neck $5^b$, through which this projection passes. In the passage of the elevator up and down the shaft these projections $3^b$, which are of different widths or placed in different vertical planes on the circumference of the rods, as shown in Fig. 9, come in contact with the heads of the bolts $5^e$ and force the spring-dogs out of engagement with the hatch-covers, as more fully explained in the description of the operation of the apparatus.

The operation is as follows: The elevator-car starts from the bottom with three hatch-covers $a$, $b$, and $c$ resting on the dogs $2^c$, $2^d$, and $2^e$ and the inner ends of the bolts $5^e$ bearing against these dogs. The outer ends of the bolts $5^e$ project out different distances or are in different locations relative to the circumference of the rods 3, so that when the elevator-car passes the floor A the heads of the bolts $5^e$ on the hatch-covers $c$ and $b$ are not in the path of the projection $3^b$ at floor A; but the head of the bolt $5^e$ on the cover $a$ comes in contact with the projection $3^b$ and releases the cover from the dog $2^c$, and the ring 5 on cover $a$ becomes engaged between the levers of the toggle, which have opened to receive it. Thus the cover $a$ is released from the car and held in the hatch at floor A. The rings 5 on the covers $c$ and $b$ are somewhat wider than the opening between the toggle-levers, and consequently span said opening, holding the toggle closed during their passage. When the car passes floor B, the head of the bolt $5^e$ on the cover $c$ passes freely by the projection $3^b$; but the bolt on the cover $b$ is in the path of said projection and the cover $b$ is released from the dog $2^d$ in the same manner as described in the release of cover $a$. The opening of the toggle at floor B is spanned by the ring 5, carried by the cover $c$, but is sufficiently large to receive the ring 5, carried by the cover $b$, and hold said cover. In like manner as the car passes the floor C the bolt on the cover $c$ comes in contact with the projection $3^b$ and releases the cover from the dog $2^e$, and the ring 5 carried by the cover $c$ is caught by the toggle at floor C. The bolts $5^e$ on the hatch-covers decrease in length from the lowest floor up—that is, the bolt $5^e$ on cover $b$ is somewhat shorter than bolt $5^e$ on cover $a$, and the bolt $5^e$ on cover $c$ is somewhat shorter than bolt $5^e$ on cover $b$, and so on, a decrease for each floor in the building. The width of the rings 5 increases and the openings in the toggles increase, and the projections $3^b$ on the enlargements $3^a$ increase the same way, or the projections $3^b$ may be staggered. As the elevator-car rises the rings 5 on the several hatch-covers $a'$ $b'$ $c'$ are released from the toggles at the floors A B C by means of a ring D on the elevator-car, which runs over and closes the toggle-jaws and permits them to pass through said rings 5. Then the hatch-covers are caught on the posts $2^a$ and carried up with the car. The ring D is provided with a slot $a^x$, made large enough to clear the projections on the enlargements $3^a$. When the car descends, the covers $a'$, $b'$, and $c'$ are released from the posts $2^a$ and caught by the toggles at their respective floors in the same manner as the covers $a$, $b$, and $c$ are released and caught in the ascension of the elevator-car.

The invention may take on various modifications in details of construction and is not, therefore, limited by the detailed construction described herein.

What is claimed, and desired to be secured by Letters Patent, is—

1. In combination with an elevator-car, rods extending the entire depth of the shaft, toggles pivoted to said rods at each floor, projections protruding inwardly from said rods, stepped posts rising from the top of the car, stepped posts depending from the bottom of the car, spring-dogs pivoted in each of the steps of all of said posts, hatch-covers carried by said posts, means for releasing said hatch-covers from the posts at their respective floors, and means for catching and holding the covers in the hatchways.

2. In combination with an elevator-car, rods extending the entire depth of the shaft, toggles pivoted to said rods at each floor and adapted to open, projections on the rods at each floor and protruding inwardly, posts rising from the top of the car, posts depending from the bottom of the car, said posts being stepped for floors in the building, spring-dogs pivoted in each of the steps of the posts and adapted to engage hatch-covers carried on the posts, spring-bolts arranged on said covers, one end of said bolts bearing against the spring-dogs and the other end extending into the path of one of the projections on the rods first mentioned.

3. The combination of an elevator-car, with posts rising from the top of the car and posts depending from the bottom of the car, said posts being stepped; hatch-covers supported on spring-dogs pivoted in the steps of the posts; spring-bolts of different lengths arranged in suitable guides on the under sides of the hatch-covers, one of the ends of each of said bolts bearing against certain of the spring-dogs; a rod extending the entire depth of the elevator-shaft, projections on the rod at each of the floors, said projections differing in width in the same proportion as the aforesaid bolts differ in lengths; rings rigidly attached to the hatch-covers, through which the rods pass, said rings being of different widths; toggles with different-sized openings corresponding with the different widths of the aforesaid rings, arranged in connection with the rod at each of the floors, so as to catch the proper ring and permit all the others to freely pass.

4. In an elevator, the combination of a hatch-closing device consisting of a hatch-cover mounted on posts rising from the top of the elevator-car and supported on spring-dogs protruding from said posts, with a hatch-cover mounted on posts depending from the bottom of the elevator-car and supported on spring-dogs protruding from said posts, rings rigidly attached to said hatch-cover, rods passing through said rings and extending the entire depth of the elevator-shaft, means for releasing the hatch-covers from the car at the desired places, and means connected with the said rods for retaining the covers at the desired places in the shaft when released from the elevator-car.

5. In an elevator, the combination of a series of hatch-covers held in engagement with the elevator-car by spring-dogs protruding from posts rising from the top of the elevator-car, with posts depending from the bottom of the elevator-car; slidable spring-bolts arranged on the under sides of the hatch-covers, their inner ends in contact with certain of the spring-dogs, said bolts being of different lengths; rings of different widths rigidly connected with the hatch-covers; rods extending the entire length of the shaft and passing through said rings; projections on said rods at each of the floors protruding inwardly different distances and arranged to come into contact each with one of the bolts aforesaid; toggles pivoted to the rods and arranged to open different widths to receive the rings of different widths.

6. In a hatch-closing device for elevators, hatch-covers provided with rings rigidly attached thereto, in combination with rods extending the entire depth of the shaft through the rings, toggles pivoted to said rods at each floor, said toggles consisting of two pairs of oppositely-disposed levers, and means for opening said levers.

7. In a hatch-closing device for elevators, posts rising from the top of the elevator-car, and posts depending from the bottom of the car, in combination with hatch-covers having holes therein through which said posts pass; spring-dogs pivoted in said posts and engaging the covers, and means for releasing the covers from their engagement with the dogs.

8. In a hatch-closing device for elevators, the combination of a series of hatch-covers carried on posts rising from the top and depending from the bottom of the elevator-car; with rings rigidly attached to the hatch-covers; rods extending the entire depth of the shaft through said rings; spring-bolts arranged on the hatch-covers; means for operating said bolts to release the hatch-covers from the car, and means connected with the rods for engaging and retaining the covers when so released.

9. In an elevator, the combination of a series of hatch-covers held in engagement with the elevator-car by spring-dogs protruding from posts rising from the top of the elevator-car, with posts depending from the bottom of the elevator-car; slidable spring-bolts arranged on the hatch-covers, their inner ends in contact with certain of the spring-dogs; rings of different widths rigidly connected with the hatch-covers; rods extending the entire depth of the shaft and passing through said rings; projections on said rods at each of the floors, said projections being arranged at different places on the circumferences of the rods; each of the aforesaid bolts so arranged on its respective hatch-covers as to come in contact with but one of the projections on one of said rods.

10. An elevator-shaft having in each corner a rod extending the entire depth thereof, and a set of toggles in pairs pivotally supported by said rods at each landing, in combination with hatch-covers adapted to be engaged by said toggles, substantially as described.

11. An elevator-shaft having a rod extending from top to bottom of the shaft at each corner, and two pairs of mechanically-connected toggles pivotally supported by each of said rods at each successive landing, in combination with hatch-covers adapted to be engaged by said toggles, substantially as described.

12. The elevator-shaft and the four several rods extending its full depth and a set of toggles for each rod at each landing, said toggles arranged in pairs pivoted at their outer ends and adapted to close at their inner ends and connected to work both pairs together, in combination with a hatch-cover having a ring to be engaged by said toggles, substantially as described.

13. A coupling for a line of rods in an elevator-shaft to be located at a landing consisting in a substantially tubular body threaded at each end and having a longitudinal recess between its threaded ends open at both its edges, and two sets of toggle-bars pivoted respectively in the ends of said recess and projecting toward each other, and the ends of the said pairs mechanically connected for conjoint action, in combination with hatch-covers adapted to be engaged by said toggles, substantially as described.

In testimony whereof we affix our signatures in the presence of two witnesses.

EDGAR STODDARD.
ANNA I. RICHARDS,
*Administratrix of estate of Harry G. Richards, deceased.*

Witnesses of signature of Edgar Stoddard:
J. A. OSBORNE,
E. J. THOBABEN.

Witnesses as to Anna I. Richards:
E. J. THOBABEN,
CHARLES HOAG.